(12) United States Patent
Alshinnawi et al.

(10) Patent No.: US 9,998,404 B2
(45) Date of Patent: Jun. 12, 2018

(54) AUTOMATICALLY ORIENTING HARDWARE PORTS IN A COMPUTING DEVICE

(71) Applicant: LENOVO ENTERPRISE SOLUTIONS (SINGAPORE) PTE. LTD., Singapore (SG)

(72) Inventors: Shareef F. Alshinnawi, Apex, NC (US); Gary D. Cudak, Wake Forest, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 332 days.

(21) Appl. No.: 14/667,761

(22) Filed: Mar. 25, 2015

(65) Prior Publication Data
US 2016/0285684 A1    Sep. 29, 2016

(51) Int. Cl.
*H04L 12/931*    (2013.01)
*H04L 12/24*    (2006.01)
*G06F 1/18*    (2006.01)

(52) U.S. Cl.
CPC ............ *H04L 49/405* (2013.01); *G06F 1/182* (2013.01); *H04L 41/12* (2013.01)

(58) Field of Classification Search
CPC combination set(s) only.
See application file for complete search history.

(56) References Cited

U.S. PATENT DOCUMENTS

| | | | |
|---|---|---|---|
| 6,290,517 B1 * | 9/2001 | Anderson | G06F 1/1616 439/131 |
| 7,540,748 B2 * | 6/2009 | Tracy | G06F 1/1616 439/131 |
| 8,068,715 B2 | 11/2011 | Kewitsch | |
| 8,204,070 B1 | 6/2012 | Ghaibeh | |
| 2009/0063733 A1 * | 3/2009 | Huang | H01R 27/00 710/38 |
| 2011/0209082 A1 * | 8/2011 | Conzola | G06F 17/509 715/771 |
| 2011/0299266 A1 | 12/2011 | Barry et al. | |
| 2011/0299822 A1 | 12/2011 | Barry et al. | |
| 2014/0181345 A1 * | 6/2014 | Huang | G06F 13/4063 710/300 |
| 2015/0253818 A1 * | 9/2015 | Wong | G06F 1/182 361/679.44 |

OTHER PUBLICATIONS

Anonymous, "Rack Identification Reporting and Illumination", IP.com Prior Art Database Technical Disclosure, May 2011, 4 pages, IP.com Electronic Publication, IP.com No. 000206950.
U.S. Appl. No. 14/205,414, filed Mar. 12, 2014, pp. 1-26.

* cited by examiner

*Primary Examiner* — Patrice L Winder
(74) *Attorney, Agent, or Firm* — Brandon C. Kennedy; Jason A. Friday; Kennedy Lenart Spraggins LLP

(57) ABSTRACT

Automatically orienting hardware ports in a computing device, including: determining a location of a first hardware port configured to receive a first cable connector of a cable; determining a location of a second hardware port configured to receive a second cable connector of the cable; determining, in dependence upon the location of the first hardware port and the location of the second hardware port, orientation information for at least one of the hardware ports; and transmitting an instruction to position at least one of the hardware ports in accordance with the orientation information.

16 Claims, 8 Drawing Sheets

AUTOMATICALLY ORIENTING HARDWARE PORTS IN A COMPUTING DEVICE

BACKGROUND OF THE INVENTION

Field of the Invention

The field of the invention is data processing, and more specifically, methods, apparatuses, and products for automatically orienting hardware ports in a computing device.

Description of Related Art

Modern computing systems can include modular computing devices that are mounted within racks or other mounting apparatuses. Such modular computing devices are frequently connected via cabling that connects to two distinct modular computing devices. As such modular computing devices become smaller, and a larger number of modular computing devices are packed into smaller spaces, cables that connect two or more modular computing devices may be bent in ways that cause the performance of the cable to degrade. For example, cable bend radius requirements for topologies such as 10 Gb Ethernet and Infiniband may be difficult to implement in restricted space for dense solutions, particularly when the modular computing devices are stacked in sequential Electronic Industries Alliance ('EIA') locations as is often the case according to best practices.

SUMMARY OF THE INVENTION

Methods, apparatuses, and products for automatically orienting hardware ports in a computing device, including: determining a location of a first hardware port configured to receive a first cable connector of a cable; determining a location of a second hardware port configured to receive a second cable connector of the cable; determining, in dependence upon the location of the first hardware port and the location of the second hardware port, orientation information for at least one of the hardware ports; and transmitting an instruction to position at least one of the hardware ports in accordance with the orientation information.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
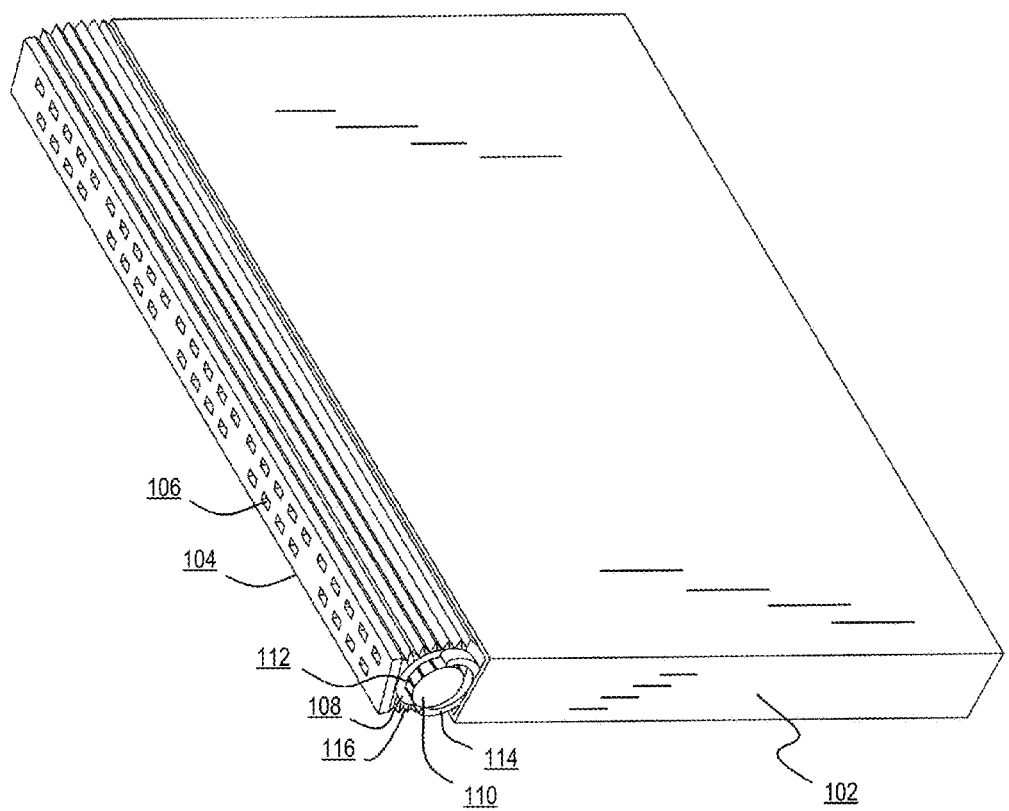
FIG. 1 sets forth a perspective view of a housing for electronic devices according to embodiments of the present invention.

Example methods, apparatus, and products for automatically orienting hardware ports in a computing device in accordance with the present invention are described with reference to the accompanying drawings, beginning with FIG. 1. FIG. 1 sets forth a perspective view of a housing for electronic devices according to embodiments of the present invention. The housing of FIG. 1 can include a chassis (102), a face plate (104), one or more hardware ports (106), a disc (108), a rotatable wheel (110), ridges (112), a clamp (114), and electromagnetic shielding (116).

The chassis (102) may serve as a mount and covering for various electronic components contained inside the housing. Examples of such electronic components that may be contained inside the housing can include one or more printed circuit boards ('PCBs'), computer processors, computer storage devices, network connection hardware, cooling fans, heat sinks, and so on. Such a housing may protect the enclosed electronic components from dust, moisture, and other harmful items, as well as protecting the enclosed electronic components from accidental physical contact with other objects.

The face plate (104) is a structure with a plurality of holes that facilitate access to the electronic components contained within the housing. Access to the electronic components contained within the housing may be facilitated through the holes in the faceplate (104) via one or more hardware ports (106). Each hardware port (106) represents an input/output ('I/O') connection point through which electronic devices contained in the housing may be connected to external electronic devices, for example, through the use of a pin that extrudes from the external electronic device, through the use of a cable that is coupled to the external electronic device, and so on.

The disc (108) depicted in FIG. 1 may be coupled to the face plate (104) and a rotatable wheel (110). A portion of the rotatable wheel (110) may reside within the housing and may be coupled to a motor (not shown) that can automatically apply a force to the rotatable wheel (110), thereby causing the disc (108) and the face plate (104) to rotate. In such a way, the rotational angle of the face plate (104) may be adjusted to place the face plate (104) and the attached hardware ports (108) into various positions. For example, a face plate (104) may be rotated upward to present the hardware ports (108) to electronic devices that are mounted above the housing, such that cabling that runs between the housing and the electronic devices that are mounted above the housing may be easily connected. Likewise, the face plate (104) may be rotated downward to present the hardware ports (108) to electronic devices that are mounted below the housing, such that cabling that runs between the housing and the electronic devices that are mounted below the housing may be easily connected. In such a way, the face plate (104) may be positioned to provide better access to the hardware ports (108) for other computing devices in a computing system that includes the housing.

Consider an example in which the housing is rack-mounted and houses server hardware that needs to be coupled to a network switch in the rack. When the network switch is mounted at a position in the rack that is above the mounting location of the housing, the face plate (104) may be rotated upward to present the hardware ports (108) to the network switch, such that cabling that runs between the housing and the network switch may be easily connected. In such an example, however, when the network switch is mounted at a position in the rack that is below the mounting location of the housing, the face plate (104) may be rotated downward to present the hardware ports (108) to the network switch, such that cabling that runs between the housing and the network switch may be easily connected.

Readers will appreciate that although the example depicted in FIG. 1 depicts a housing that includes only a single face plate (104) that rotates as a single unit, a housing may include many face plates such that only a selected subset of hardware ports (108) are rotated. As such, one set of hardware ports (108) may be placed in a first position while another set of hardware ports (108) may be placed in a second position.

Figure 2:
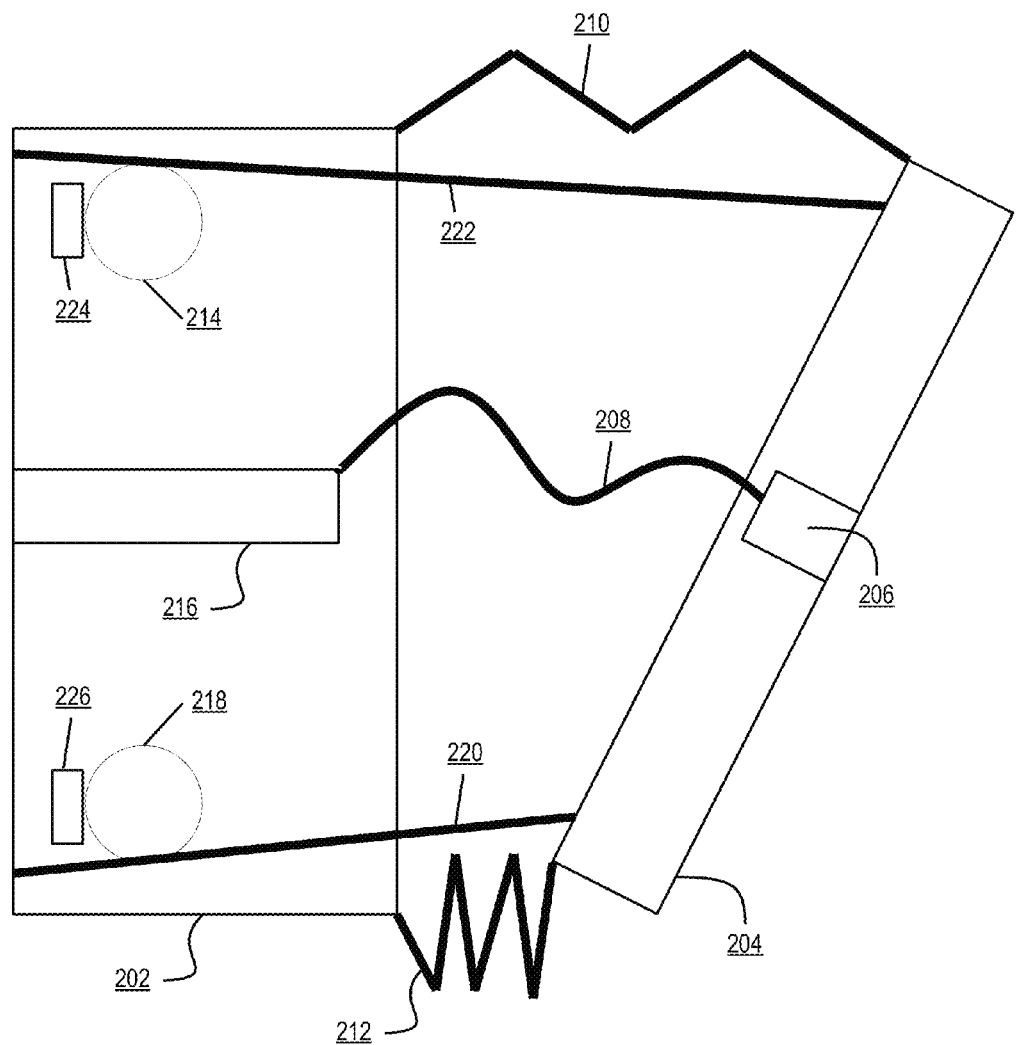
FIG. 2 sets forth a transverse sectional view of a housing for electronic devices according to embodiments of the present invention.

For further explanation, FIG. 2 sets forth a transverse sectional view of a housing for electronic devices according to embodiments of the present invention. The housing of FIG. 2 is similar to the housing depicted in FIG. 1, as the housing includes a chassis (202), a face plate (204), and one or more hardware ports (206). The housing depicted in FIG. 2 also includes an electronic component (216), a flexible cable (208) that couples the electronic component (216) to the hardware port (206), flexible electromagnetic shielding (210, 212), two adjustment rods (220, 222), two motors (214, 218), and two motor controllers (224, 226).

The two motors (214, 218) depicted in FIG. 2 may be embodied as a physical devices that create physical motion, such as an electronic motor that converts electrical energy into mechanical energy. In such an example, the two motors (214, 218) may be utilized to impart motion on the two adjustment rods (220, 222), which may be embodied as metal rods attached to the face plate (204) of the housing. Readers will appreciate that by imparting motion on the two adjustment rods (220, 222), the two motors (214, 218) may cause the orientation of the face place (204) to change, thereby causing the orientation of the hardware ports (206) to also change.

In the example depicted in FIG. 2, the operation of the two motors (214, 218) is controlled through the use of two motor controllers (224, 226). The motor controllers (224, 226) depicted in FIG. 2 may be embodied as hardware devices, such as a microcontrollers, application-specific integrated circuits ('ASICs'), or other devices that can control the operation of the motors (214, 218). Controlling the operation of the motors (214, 218) can include setting the motors (214, 218) into a specific gear (e.g., forward, reverse), powering on the motors (214, 218), powering off the motors (214, 218), and so on. The motor controllers (224, 226) depicted in FIG. 2 may also be configured for data communications via one or more data connections. For example, the motor controllers (224, 226) may include data communications hardware that is coupled to a data communications network, a data communications link to another device such as a server that is serving as a system management module, and so on.

The motor controllers (224, 226) depicted in FIG. 2 may be configured to receive orientation information for the hardware port (206). The motor controllers (224, 226) may receive orientation information for the hardware port (206), for example, via one or more messages received over a data communications network, via one or more messages received over a data communications link to another device such as a server that is serving as a system management module, and so on. As such, the orientation information for the hardware port (206) may be received from a system management module. Such orientation information can include an identification of the hardware port (206) that is to be positioned in accordance with the orientation information, information identifying the desired angle of orientation for the hardware port (206) relative to a fixed position such as a plane of the chassis (202), and so on.

The motor controllers (224, 226) depicted in FIG. 2 may further be configured to position, via the motors (214, 218), the hardware port (206) in dependence upon the orientation information. In the example depicted in FIG. 2, the face plate (204) of the housing may be automatically adjusted through the use of the two motors (214, 218) extending or retracting the two adjustment rods (220, 222). To adjust the face plate (204) downward, for example, the top motor (214) may extend the top adjustment rod (222) while the bottom motor (218) retracts the bottom adjustment rod (220). Likewise, to adjust the face plate (204) upward, the top motor (214) may retract the top adjustment rod (222) while the bottom motor (218) extends the bottom adjustment rod (220). Because the face plate (204) is coupled to the chassis (202) through the use of flexible electromagnetic shielding (210, 212), the housing may remain sealed as the flexible electromagnetic shielding (210, 212) will adjust and compress as the bottom edge and the top edge of the face plate (204) are moved. Readers will appreciate that in the example depicted in FIG. 2, the motors (214, 218) are operatively coupled to the hardware port (206) via the two adjustment rods (220, 222) and the face plate (204).

In the example depicted in FIG. 2, the motor controllers (224, 226) can position the hardware port (206) in dependence upon the orientation information, for example, by operating the motors (214, 218) in a way that causes the face plate (204) to rotate such that the hardware port (206) is oriented in accordance with the orientation information. As such, positioning the hardware port (206) in dependence upon the orientation information may be carried out determining a desired operational mode (e.g., forward, reverse) for one or more of the motors (214, 218), determining a desired amount of time for one or more of the motors (214, 218) to operate, and sending an instruction to one or more of the motors (214, 218) to operate in accordance with the desired operational mode for the desired amount of time. Sending an instruction to one or more of the motors (214, 218) to operate in accordance with the desired operational mode for the desired amount of time can be carried out by sending an instruction to the motor to operate in the desired operational mode, sending an instruction to power-on the motor, and sending an instruction to power-off the motor upon the expiration of the desired amount of time.

Consider an example in which the motor controllers (224, 226) depicted in FIG. 2 received orientation information indicating that hardware port (206) depicted in FIG. 2 should be repositioned to be oriented at a ninety degree angle relative to the bottom plane of the chassis (202). In such an example, repositioning the hardware port (206) to be oriented at a ninety degree angle relative to the bottom plane of the chassis (202) could be accomplished by the bottom motor (218) extending the bottom adjustment rod (220), while the top motor (214) does not move the top adjustment rod (222), until the bottom adjustment rod (220) and the top adjustment rod (222) are extended the same amount. In such an example, each motor controller (224, 226) may store information identifying the extent to which its associated adjustment rod (220, 222) should be extended or retracted for each available angle of orientation. For example, each motor controller (224, 226) may store as table similar to the table included below in memory that is included in each motor controller (224, 226):

TABLE 1

Positioning Table

| Relative Port Angle (Degrees) | Top Adjustment Rod Extension (cm) | Bottom Adjustment Rod Extension (cm) |
|---|---|---|
| 15 | 0 | 5 |
| 30 | 0 | 4 |
| 45 | 0 | 3 |
| 60 | 0 | 2 |
| 75 | 0 | 1 |
| 90 | 0 | 0 |
| 105 | 1 | 0 |
| 120 | 2 | 0 |
| 135 | 3 | 0 |
| 150 | 4 | 0 |
| 165 | 5 | 0 |

Table 1 includes a first column labeled 'relative port angle' where each entry is measured in terms of degrees relative to the bottom plane of the chassis (202). As such, a relative port angle of 15 degrees means that the bottom adjustment rod (220) is significantly extended while the top adjustment rod (222) is not extended at all, such that the face plate (204) faces substantially upward. Likewise, a relative port angle of 165 degrees means that the top adjustment rod (222) is significantly extended while the bottom adjustment rod (220) is not extended at all, such that the face plate (204) faces substantially downward. The example depicted in FIG. 2 illustrates an embodiment where the face plate (204) is roughly at a 120 degree angle of orientation relative to the bottom plane of the chassis (202), as a line that runs along the bottom plane of the chassis (202) and a line that runs along the front of the face plate (204) (where the opening that exposes the hardware port (206) resides), intersect at an angle of roughly 120 degrees. Readers will appreciate that through the use of a table such as Table 1, each motor controller (224, 226) can determine how far to extended its associated adjustment rod (220, 222) to achieve the desired orientation, as specified in the orientation information.

Readers will appreciate that the example depicted in FIG. 2 is included for explanation and not limitation. Housings for electronic devices may be constructed in many other ways in accordance with embodiments of the present invention and may include other component parts, so long as the housing includes one or more motors and one or more motor controllers that are configured to receive orientation information for one or more hardware ports and further configured to position, via the motor, the one or more hardware ports in dependence upon the orientation information.

Figure 3:
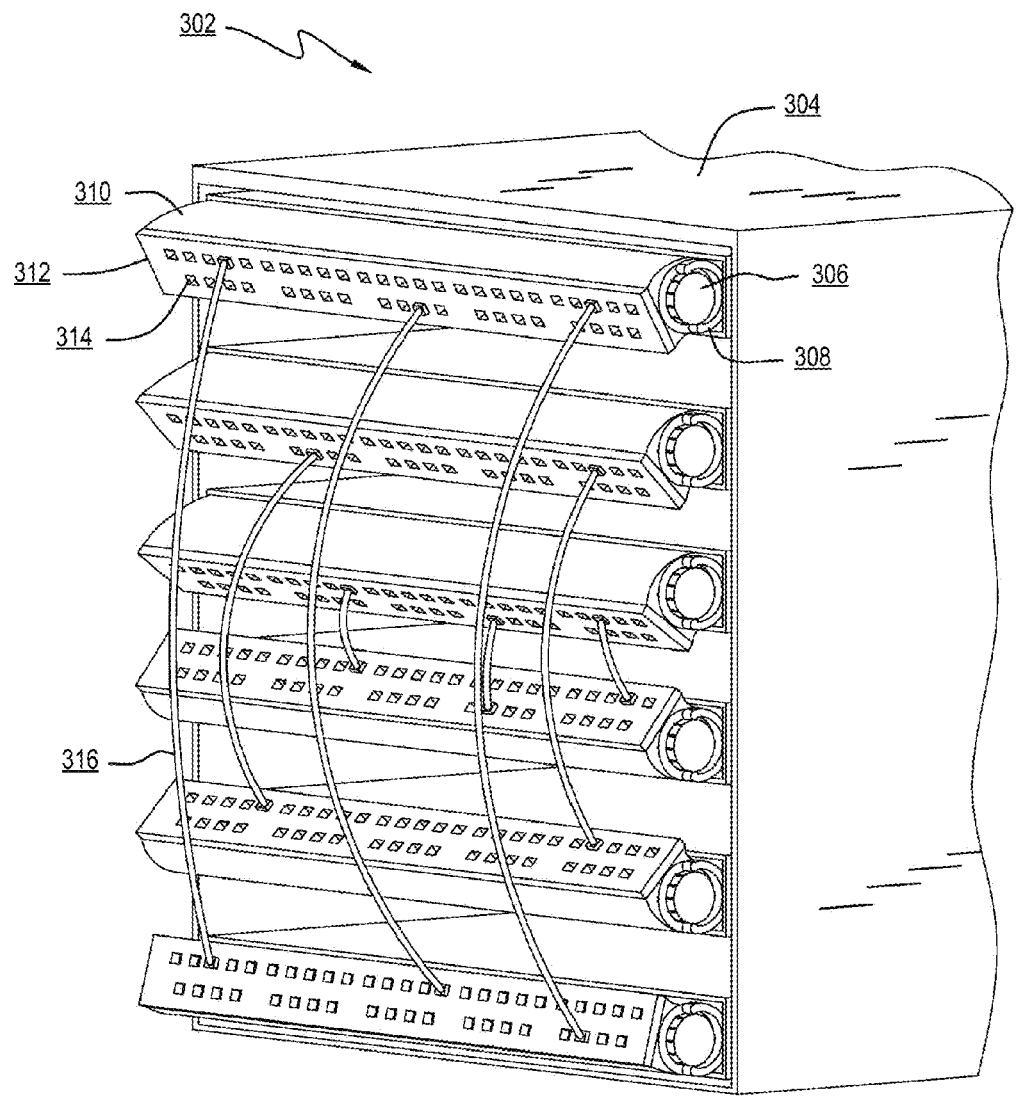
FIG. 3 sets forth a perspective view of a rack holding multiple device housings with rotationally adjustable port faces according to embodiments of the present invention.

For further explanation, FIG. 3 sets forth a perspective view of a rack (302) holding multiple device housings with rotationally adjustable port faces according to embodiments of the present invention. The rack (302) depicted in FIG. 3 includes a cabinet (304) configured to hold a plurality of electronic device housings that may be similar to the electronic device housings depicted in FIG. 1 and FIG. 2. The cabinet (304) may be embodied, for example, as a floor mounted rack, open frame rack, portable rack, and so on. The cabinet (304) may include space to insert a plurality of electronic devices, including one or more slots that are each configured to receive an electronic device housing that may be similar to the electronic device housings depicted in FIG. 1 and FIG. 2. Each electronic device housing illustrated in FIG. 3 is similar to the electronic device housing depicted in FIG. 1, as each electronic device housing illustrated in FIG. 3 also includes a chassis, a face plate (312), one or more hardware ports (314), a disc, a rotatable wheel (306), ridges, a clamp (308), and electromagnetic shielding (310). In the example depicted in FIG. 3, two or more of the electronic device housings are connected via a cable (316) that is coupled to hardware ports in each of the electronic device housings. Readers will appreciate that by adjusting the orientation of the hardware ports in each of the electronic device housings, the cables (316) that run between the hardware ports in each of the electronic device housings are not required to bend in ways that would exceed the cable's bend radius. As such, the performance of the cables (316) does not degrade, as occurs when the bend radius of a particular cable is exceeded.

The arrangement of servers and other devices making up the example system illustrated in FIG. 3 are for explanation, not for limitation. Data processing systems useful according to various embodiments of the present invention may include additional servers, routers, other devices, and peer-to-peer architectures, not shown in FIG. 3, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 3.

Automatically orienting hardware ports in a computing device in accordance with the present invention is generally implemented with computers, that is, with automated computing machinery. For further explanation, therefore, FIG. 4 sets forth a block diagram of automated computing machinery comprising an example system management server (452) useful in automatically orienting hardware ports in a computing device according to embodiments of the present invention. The system management server (452) of FIG. 4 includes at least one computer processor (456) or 'CPU' as well as random access memory (468) ('RAM') which is connected through a high speed memory bus (466) and bus adapter (458) to processor (456) and to other components of the system management server (452).

Figure 4:
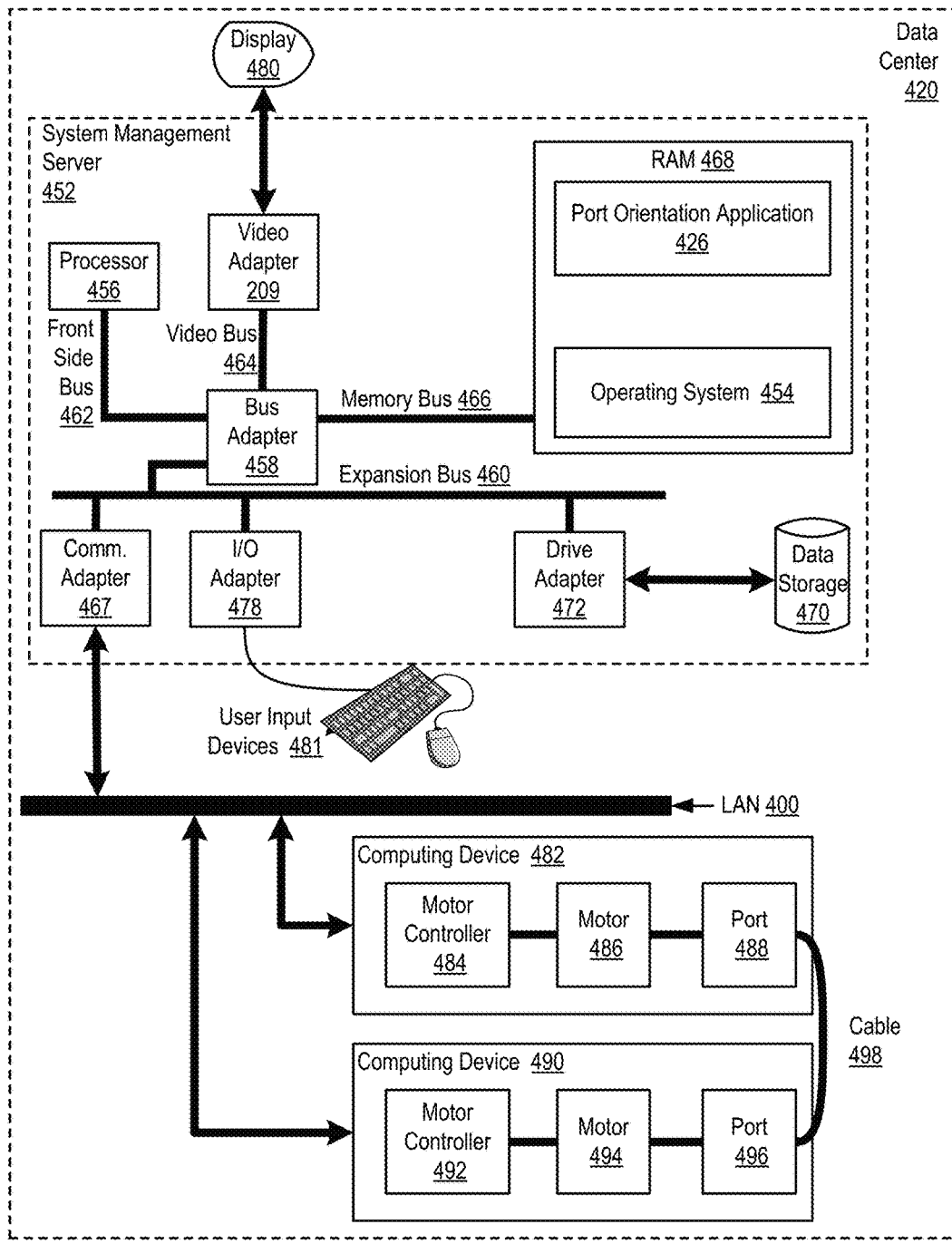
FIG. 4 sets forth a block diagram of automated computing machinery comprising an example system management server useful in automatically orienting hardware ports in a computing device according to embodiments of the present invention.

The system management server (452) depicted in FIG. 4 resides in a data center (420). The data center (420) of FIG. 4 may be embodied, for example, as a facility used to house computer systems and associated components, such servers, network switches, storage systems, and so on.

Stored in RAM (468) is a port orientation module (426), a module of computer program instructions for automatically orienting hardware ports (488, 496) in a computing device (482, 490). The port orientation module (426) may be configured to automatically orient hardware ports (488, 496) in a computing device (482, 490) by determining a location of a first hardware port (488) configured to receive a first cable connector of a cable (498); determining a location of a second hardware port (496) configured to receive a second cable connector of the cable (498); determining, in dependence upon the location of the first hardware port (488) and the location of the second hardware port (496), orientation information for at least one of the hardware ports (488, 496); and transmitting an instruction to position at least one of the hardware ports (488, 496) in accordance with the orientation information, as described in greater detail throughout the remainder of the specification.

Also stored in RAM (468) is an operating system (454). Operating systems useful automatically orienting hardware ports in a computing device according to embodiments of the present invention include UNIX™, Linux™, Microsoft XP™, AIX™, and others as will occur to those of skill in the art. The operating system (454) and the port orientation module (426) in the example of FIG. 4 are shown in RAM (468), but many components of such software typically are stored in non-volatile memory also, such as, for example, on a disk drive (470).

The system management server (452) of FIG. 4 includes disk drive adapter (472) coupled through expansion bus (460) and bus adapter (458) to processor (456) and other components of the system management server (452). Disk drive adapter (472) connects non-volatile data storage to the system management server (452) in the form of disk drive (470). Disk drive adapters useful in computers for [preamble] according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example system management server (452) of FIG. 4 includes one or more input/output ('I/O') adapters (478). I/O adapters implement user-oriented input/output through, for example, software drivers and computer hardware for controlling output to display devices such as computer display screens, as well as user input from user input devices (481) such as keyboards and mice. The example system management server (452) of FIG. 4 includes a video adapter (209), which is an example of an I/O adapter specially designed for graphic output to a display device (480) such as a display screen or computer monitor. Video adapter (209) is connected to processor (456) through a high speed video bus (464), bus adapter (458), and the front side bus (462), which is also a high speed bus.

The example system management server (452) of FIG. 4 includes a communications adapter (467) for data communications with other computers and for data communications with a data communications network (400). For example, the system management server (452) of FIG. 4 may be configured for data communications with computing devices (482, 490) that include motor controllers (484, 492), motors (486, 494), and hardware ports (488, 496) as described above with reference to FIGS. 1-3. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for automatically orienting hardware ports in a computing device according to embodiments of the present invention include modems for wired dial-up communications, Ethernet (IEEE 802.3) adapters for wired data communications network communications, and 802.11 adapters for wireless data communications network communications.

The arrangement of servers and other devices making up the example system illustrated in FIG. 4 are for explanation, not for limitation. Data processing systems useful according to various embodiments of the present invention may include additional servers, routers, other devices, and peer-to-peer architectures, not shown in FIG. 4, as will occur to those of skill in the art. Networks in such data processing systems may support many data communications protocols, including for example TCP, IP, HTTP, WAP, HDTP, and others as will occur to those of skill in the art. Various embodiments of the present invention may be implemented on a variety of hardware platforms in addition to those illustrated in FIG. 4.

Figure 5:
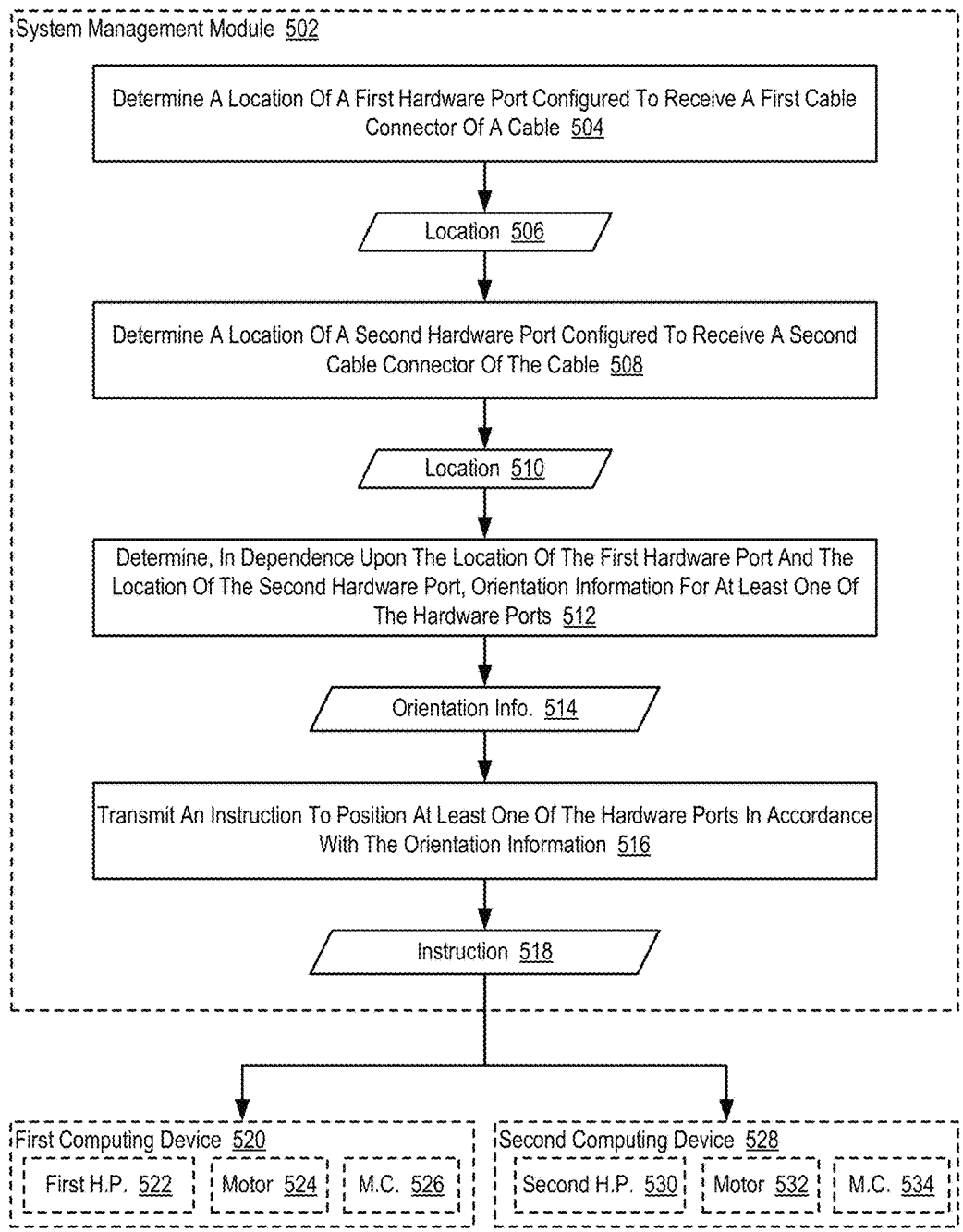
FIG. 5 sets forth a flow chart illustrating an example method for automatically orienting hardware ports in a computing device according to embodiments of the present invention.

For further explanation, FIG. 5 sets forth a flow chart illustrating a further example method for automatically orienting hardware ports in a computing device according to embodiments of the present invention. The example method depicted in FIG. 5 is carried out, at least in part, by a system management module (502). The system management module (502) depicted in FIG. 5 may be embodied, for example, as a module of computer program instructions executing on computer hardware such as one or more computer processors. The system management module (502) may reside in a server or other computing device that includes computer memory for storing the computer program instructions and also includes one or more computer processors for executing the computer program instructions. The system management module (502) may be configured to manage various operations of a plurality of computing devices. For example, the system management module (502) may be configured to manage various operations of a plurality of rack-mounted servers that are communicatively coupled to a server that is executing the system management module (502) via one or more data communications networks. In such a way, the system management module (502) may receive information from the plurality of rack-mounted servers and may also send information, such as instructions, to the plurality of rack-mounted servers.

The example method depicted in FIG. 5 includes determining (504) a location (506) of a first hardware port (522) configured to receive a first cable connector of a cable. The location (506) of the first hardware port (522) may be specified, for example, in terms of a particular slot within a rack that the computing device (520) that includes the first hardware port (522) is mounted within. For example, the location (506) of the first hardware port (522) may be specified as a slot number that identifies the particular slot that the first computing device (520) is mounted within. Readers will appreciate that the location (506) of the first hardware port (522) may be specified in more detailed terms as the location (506) of the first hardware port (522) may include, for example, information identifying the slot within which the first computing device (520) is mounted as well as information identifying an area on a face plate of the first computing device (520) where the first hardware port (522) is located. Readers will appreciate that the location (506) of the first hardware port (522) may also include, for example, information identifying a particular face plate of the first computing device (520) where the first hardware port (522) is located, information identifying dimensions of the face plate of the first computing device (520) where the first hardware port (522) is located, and so on.

In the example method depicted in FIG. 5, the first hardware port (522) is configured to receive a first cable connector of a cable. Such a cable may be embodied, for example, as a category 5 ('cat 5') data communications cable, as a category 6 ('cat 6') data communications cable, and so on. Such a cable may include a plurality of cable connectors that may be embodied, for example, as a plug face that includes a plurality of pins. In such an example, the first hardware port (522) may be configured to receive the first cable connector of the cable by providing a physical interface to secure the first cable connector of the cable to the first hardware port (522) and also providing connector pins to electronically couple pins in the first cable connector of the cable to one or more signal paths of the first hardware port (522). Readers will appreciate that while FIG. 5 refers to a 'first' cable connector and a 'second' cable connector of the cable, bi-directional data communications may carried out across the cable and in many cases each cable connector may be physically identical. The designation of each cable connector as a 'first' or 'second' cable connector is primarily to indicate that the cable has two ends that are connected to different hardware ports that are frequently part of different computing devices.

In the example method depicted in FIG. 5, determining (504) the location (506) of the first hardware port (522) configured to receive the first cable connector of the cable may be carried out, for example, by the system management module (502) detecting the insertion of the first computing device (520) into a mounting apparatus such as a server rack. In such an example, the server rack may include sensors, electrical connectors, or other hardware that can detect that the first computing device (520) has been mounted within the rack. Such hardware can be programmed to include information such as a slot number that identifies the slot within the rack that has received the first computing device (520). Such information may be communicated to the system management module (502), such that the system management module (502) becomes aware that the first computing device (520) has been mounted within the rack and also becomes aware of the location within that rack where the first computing device (520) has been mounted.

The example method depicted in FIG. 5 also includes determining (508) a location (510) of a second hardware port (530) configured to receive a second cable connector of the cable. Determining (508) the location (510) of the second hardware port (530) configured to receive the second cable connector of the cable may be carried out, for example, by the system management module (502) detecting the insertion of the second computing device (528) into a mounting apparatus such as a server rack. In such an example, the server rack may include sensors, electrical connectors, or other hardware that can detect that the second computing device (528) has been mounted within the rack. Such hardware can be programmed to include information such as a slot number that identifies the slot within the rack that has received the second computing device (528). Such information may be communicated to the system management module (502), such that the system management module (502) becomes aware that the second computing device (528) has been mounted within the rack and also becomes aware of the location within that rack where the second computing device (528) has been mounted.

Readers will appreciate that in the example depicted in FIG. 5, each time a computing device is inserted into a mounting apparatus such as a rack, information describing a device type for the computing device may be transmitted to the system management module (502). In such a way, the system management module (502) can utilize predetermined rules to determine that two particular computing devices will be communicatively coupled via a cable by virtue of their device types. For example, when the system management module (502) detects the insertion of a rack mounted server, the system management module (502) may apply a rule indicating that all rack mounted servers are to be coupled to a data communications switch that is also mounted in the rack, such that the system management module (502) may determine that a hardware port within the rack mounted server should be oriented in such a way to facilitate a connection between the rack mounted server and a data communications switch whose location is already known.

The example method depicted in FIG. 5 also includes determining (512), in dependence upon the location (506) of the first hardware port (522) and the location (510) of the second hardware port (530), orientation information (514) for at least one of the hardware ports (522, 530). In the example method depicted in FIG. 5, orientation information (514) for at least one of the hardware ports (522, 530) can include a rotational angle and rotational direction for at least one of the hardware ports (522, 530). The orientation information (514) for at least one of the hardware ports (522, 530) may be determined (512), for example, by the system management module (502) performing a lookup in a preconfigured table that includes rotational angles for each hardware port (522, 530) based on the location (506) of the first hardware port (522) and the location (510) of the second hardware port (530), by the system management module (502) performing a lookup in a preconfigured table that includes rotational angles for each hardware port (522, 530) based on the relative distance (e.g., number of slots in a rack) between the location (506) of the first hardware port (522) and the location (510) of the second hardware port (530), and so on.

Readers will appreciate that in determining (512) the orientation information (514) for at least one of the hardware ports (522, 530), the system management module (502) may take into account the type of each computing device (520, 528) that is to be coupled via the cable, the already existing connections between each computing device (520, 528) to other computing devices, and so on. Consider an example in which the first computing device (520) is a rack mounted server and the second computing device (528) is a data communications switch. In such an example, the data communications switch may have its face plate oriented in a way to facilitate connections with other rack mounted servers, such that adjusting the orientation of its face plate to accommodate a connection with the first computing device (520) may compromise other connections with other computing devices. As such, in order to facilitate a connection between the first computing device (520) and the second computing device (528), the system management module (502) may require that the first computing device (520) bear the burden of adjusting the orientation of its hardware port (522), rather than requiring the second computing device (528) to adjust the orientation of its hardware port (530).

The example method depicted in FIG. 5 also includes transmitting (516) an instruction (518) to position at least one of the hardware ports (522, 520) in accordance with the orientation information (518). Transmitting (516) the instruction (518) to position at least one of the hardware ports (522, 520) in accordance with the orientation information (518) may be carried out, for example, by the system management module (502) sending one or more messages to one of the motor controllers (526, 534) over a data communications link between the system management module (502) and the motor controllers (526, 534). In response to such messages, the motor controllers (526, 534) may power on one or more of the motors (524, 532), power off one or more of the motors (524, 532), configure one or more of the motors (524, 532) to operate in a specific operational mode, and so on.

Figure 6:
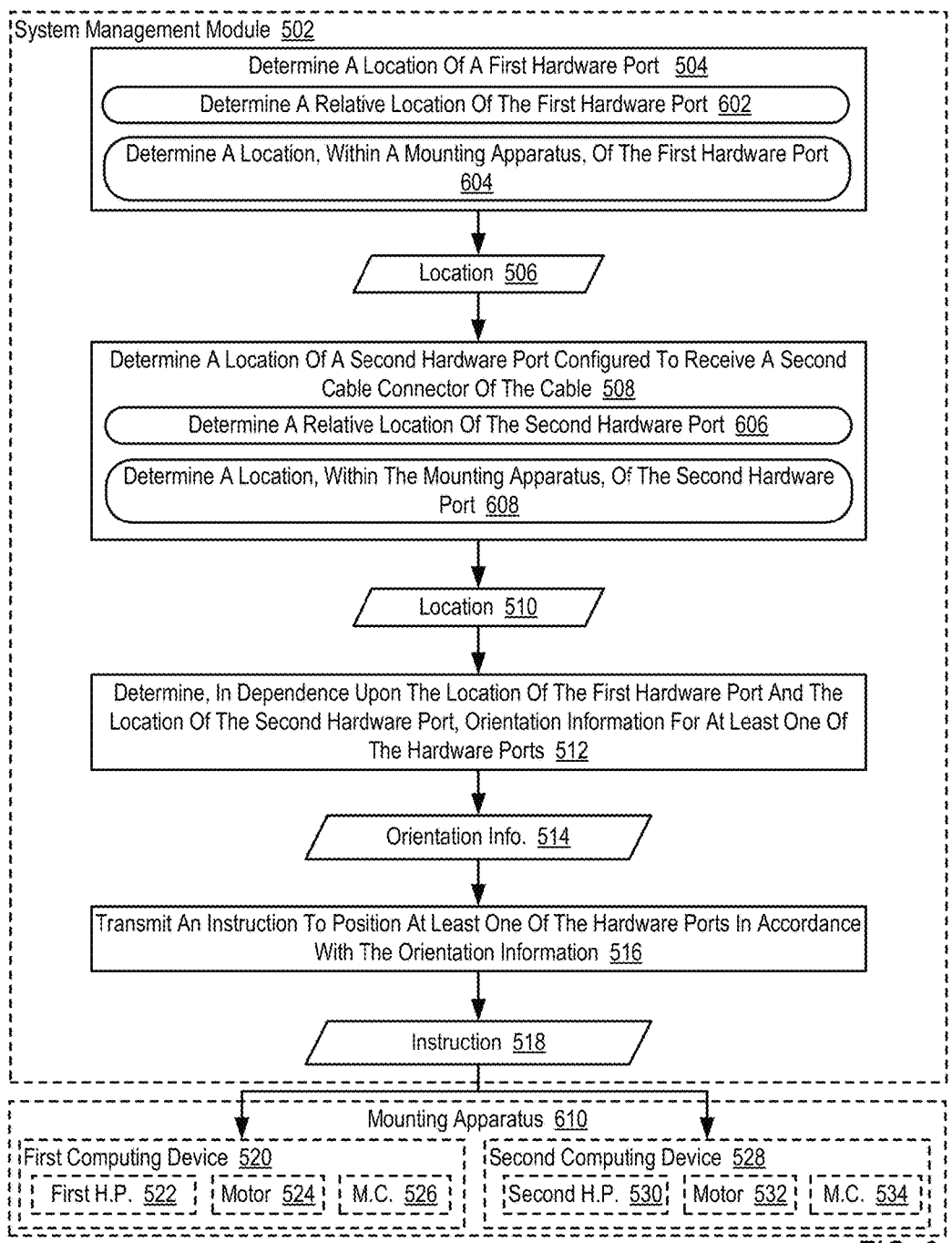
FIG. 6 sets forth a flow chart illustrating a further example method for automatically orienting hardware ports in a computing device according to embodiments of the present invention.

For further explanation, FIG. 6 sets forth a flow chart illustrating a further example method for automatically orienting hardware ports in a computing device according to embodiments of the present invention. The example method depicted in FIG. 6 is similar to the example method depicted in FIG. 5, as the example method depicted in FIG. 6 also includes determining (504) a location (506) of a first hardware port (522) configured to receive a first cable connector of a cable, determining (508) a location (510) of a second hardware port (530) configured to receive a second cable connector of the cable, determining (512) orientation information (514) for at least one of the hardware ports (522, 530), and transmitting (516) an instruction (518) to position at least one of the hardware ports (522, 520) in accordance with the orientation information (518).

In the example method depicted in FIG. 6, determining (504) a location (506) of a first hardware port (522) configured to receive a first cable connector of a cable can include determining (602) a relative location of the first hardware port (522). The relative location of the first hardware port (522) may be embodied, for example, as a location of the first computing device (520) that includes the first hardware port (522) relative to a fixed location. For example, the relative location of the first hardware port (522) may be embodied as the physical distance between the first computing device (520) and a network switch, the physical distance between the first computing device (520) and another electronic device such as the second computing device (528), the physical distance between the first computing device (520) and a fixed location within a rack, and so on. Determining (602) the relative location of the first hardware port (522) may be carried out, for example, by receiving the slot number for the slot where the first computing device (520) is mounted, receiving the slot number for the slot where a network switch or another electronic device such as the second computing device (528) is mounted, determining the difference between the two slot numbers, and multiplying the difference between the two slot numbers by the height of each slot.

In the example method depicted in FIG. 6, determining (504) a location (506) of a first hardware port (522) configured to receive a first cable connector of a cable can alternatively include determining (604) a location, within a mounting apparatus (610), of the first hardware port (522). The location of the first hardware port (522) within a mounting apparatus (610) may be embodied, for example, a slot number within a rack that identifies a slot where the first computing device (520) is mounted. In such an example, determining (604) a location of the first hardware port (522) within a mounting apparatus (610) may be carried out through the use of a sensor or other detection component that is mounted within each slot in a rack. The sensor or other detection component that is mounted within each slot in a rack may detect that the first computing device (520) has been inserted into a particular slot within the rack, and such information may be communications to the system management module (502).

In the example method depicted in FIG. 6, determining (508) a location (510) of a second hardware port (530) configured to receive a second cable connector of the cable can include determining (606) a relative location of the second hardware port (530). The relative location of the second hardware port (530) may be embodied, for example, as a location of the second computing device (528) that includes the second hardware port (530) relative to a fixed location. For example, the relative location of the second hardware port (530) may be embodied as the physical distance between the slot in a rack where the second computing device (528) is mounted and the slot in the rack where a network switch that is mounted, the physical distance between the second computing device (528) and another electronic device such as the first computing device (520), the physical distance between the second computing device (528) and a fixed location within a rack, and so on. Determining (606) a relative location of the second hardware port (530) may be carried out, for example, by receiving the slot number for the slot where the second computing device (528) is mounted, receiving the slot number for the slot where a network switch or another electronic device such as the first computing device (520) is mounted, determining the difference between the two slot numbers, and multiplying the difference between the two slot numbers by the height of each slot.

In the example method depicted in FIG. 6, determining (508) a location (510) of a second hardware port (530) configured to receive a second cable connector of the cable can include determining (608) a location, within the mounting apparatus (610), of the second hardware port (530). The location of the second hardware port (530) within a mounting apparatus (610) may be embodied, for example, a slot number within a rack that identifies a slot where the electronic housing that includes the second hardware port (530) is mounted. In such an example, determining (604) a location of the second hardware port (530) within a mounting apparatus (610) may be carried out through the use of a sensor or other detection component that is mounted within each slot in a rack. The sensor or other detection component that is mounted within each slot in a rack may detect that the second computing device (528) has been inserted into a particular slot within the rack, and such information may be communications to the system management module (502).

Figure 7:
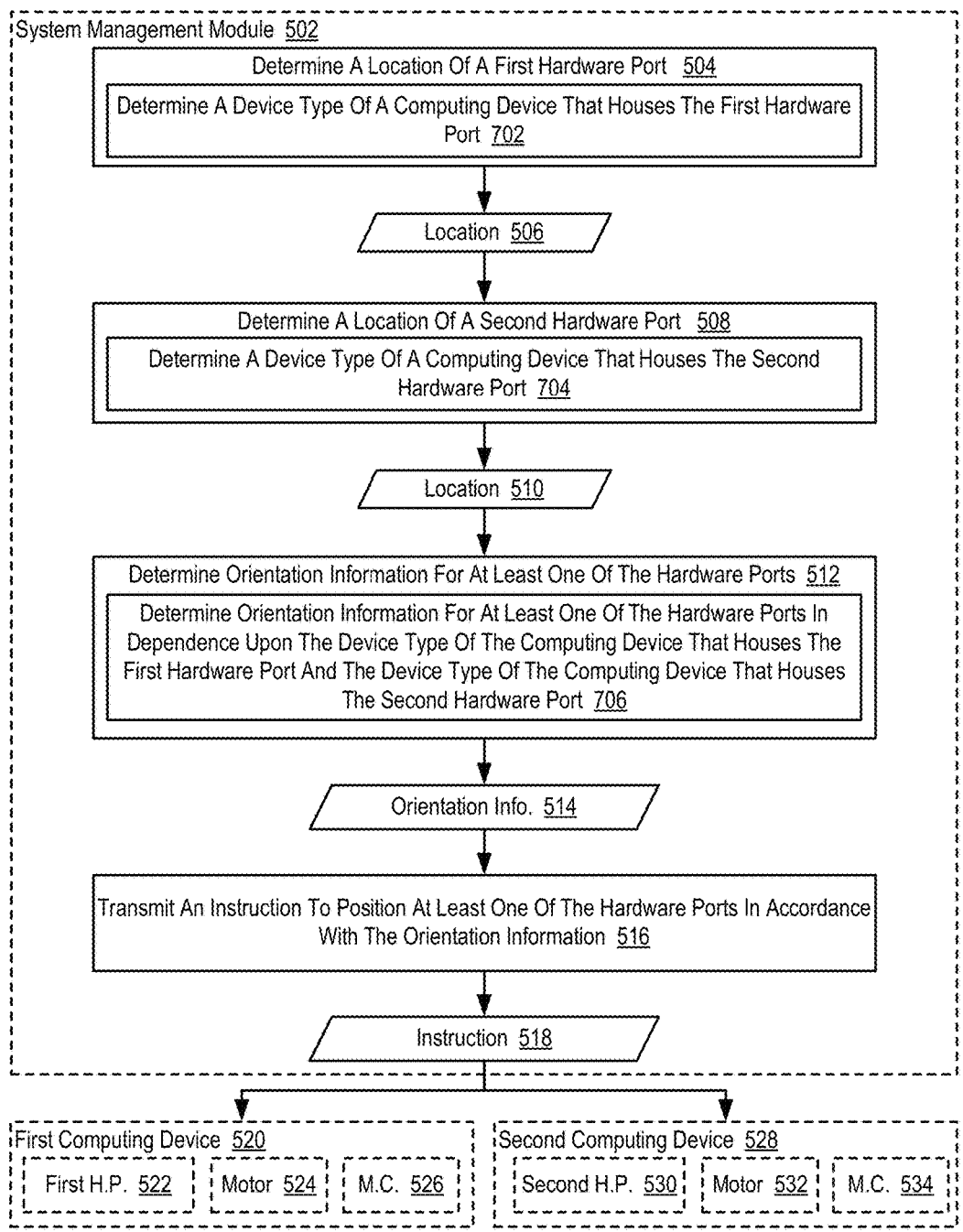
FIG. 7 sets forth a flow chart illustrating a further example method for automatically orienting hardware ports in a computing device according to embodiments of the present invention.

For further explanation, FIG. 7 sets forth a flow chart illustrating a further example method for automatically orienting hardware ports in a computing device according to embodiments of the present invention. The example method depicted in FIG. 7 is similar to the example method depicted in FIG. 5, as the example method depicted in FIG. 7 also includes determining (504) a location (506) of a first hardware port (522) configured to receive a first cable connector of a cable, determining (508) a location (510) of a second hardware port (530) configured to receive a second cable connector of the cable, determining (512) orientation information (514) for at least one of the hardware ports (522, 530), and transmitting (516) an instruction (518) to position at least one of the hardware ports (522, 520) in accordance with the orientation information (518).

In the example method depicted in FIG. 7, determining (504) a location (506) of a first hardware port (522) configured to receive a first cable connector of a cable can include determining (702) a device type of a computing device (520) that houses the first hardware port (522). The device type of the computing device (520) that houses the first hardware port (522) may be, for example, a network switch device type, a server device type, a system management module server device type, and so on. In such an example, the available device types may be created by a system administrator or other administrative entity such that each type of device within a particular computing system is included in a list of available device types. In the example method depicted in FIG. 7, determining (702) the device type of the computing device (520) that houses the first hardware port (522) may be carried out, for example, by the system management module (502) sending a message to the computing device (520) requesting that the computing device (520) provide its device type, by the system management module (502) sending a message to the computing device (520) requesting that the computing device (520) provide a serial number or other form of identification from which the system management module (502) can extrapolate the device type of the computing device (520), by the computing device (520) providing its device type to the system management module (502) upon the computing device (520) being inserted into a rack managed by the system management module (502), and so on.

In the example method depicted in FIG. 7, determining (508) a location (510) of a second hardware port (530) configured to receive a second cable connector of the cable can include determining (704) a device type of a computing device (528) that houses the second hardware port (530). The device type of the computing device (528) may be, for example, a network switch device type, a server device type, a system management module server device type, and so on. In such an example, the available device types may be created by a system administrator or other administrative entity such that each type of device within a particular computing system is included in a list of available device types. In the example method depicted in FIG. 7, determining (704) the device type of the computing device (528) that houses the second hardware port (530) may be carried out, for example, by the system management module (502) sending a message to the computing device (528) requesting that the computing device (528) provide its device type, by the system management module (502) sending a message to the computing device (528) requesting that the computing device (528) provide a serial number or other form of identification from which the system management module (502) can extrapolate the device type of the computing device (528), by the computing device (528) providing its device type to the system management module (502) upon the computing device (528) being inserted into a rack managed by the system management module (502), and so on.

In the example method depicted in FIG. 7, determining (512) orientation information for at least one of the hardware ports can include determining (706) orientation information (514) for at least one of the hardware ports (522, 530) in dependence upon the device type of the computing device (520) that houses the first hardware port (522) and the device type of the computing device (528) that houses the second hardware port (530). Determining (706) orientation information (514) for at least one of the hardware ports (522, 530) in dependence upon the device type of the computing device (520) that houses the first hardware port (522) and the device type of the computing device (528) that houses the second hardware port (530) may be carried out, for example, by determining whether each computing device (520, 528) is of a device type that can change the orientation of its hardware ports (522, 530). Some devices of a particular type such as a 'network switch' device type may be unable to change the orientation of its hardware ports (522, 530) because the network switch can receive cables from other computing devices that are mounted above and below the network switch in a rack. Likewise, devices of another particular type such as a 'fixed face' device type may be unable to change the orientation of its hardware ports (522, 530) because the device has a fixed face plate that cannot be rotated. In such an example, when one of the devices is incapable of re-orienting its hardware ports, a computing device that can re-orient its hardware ports may be required to adjust its hardware ports more significantly when it is coupled to a device that is incapable of re-orienting its hardware ports than when the computing device that can re-orient its hardware ports is coupled to another computing device that is capable of re-orienting its hardware ports.

Figure 8:
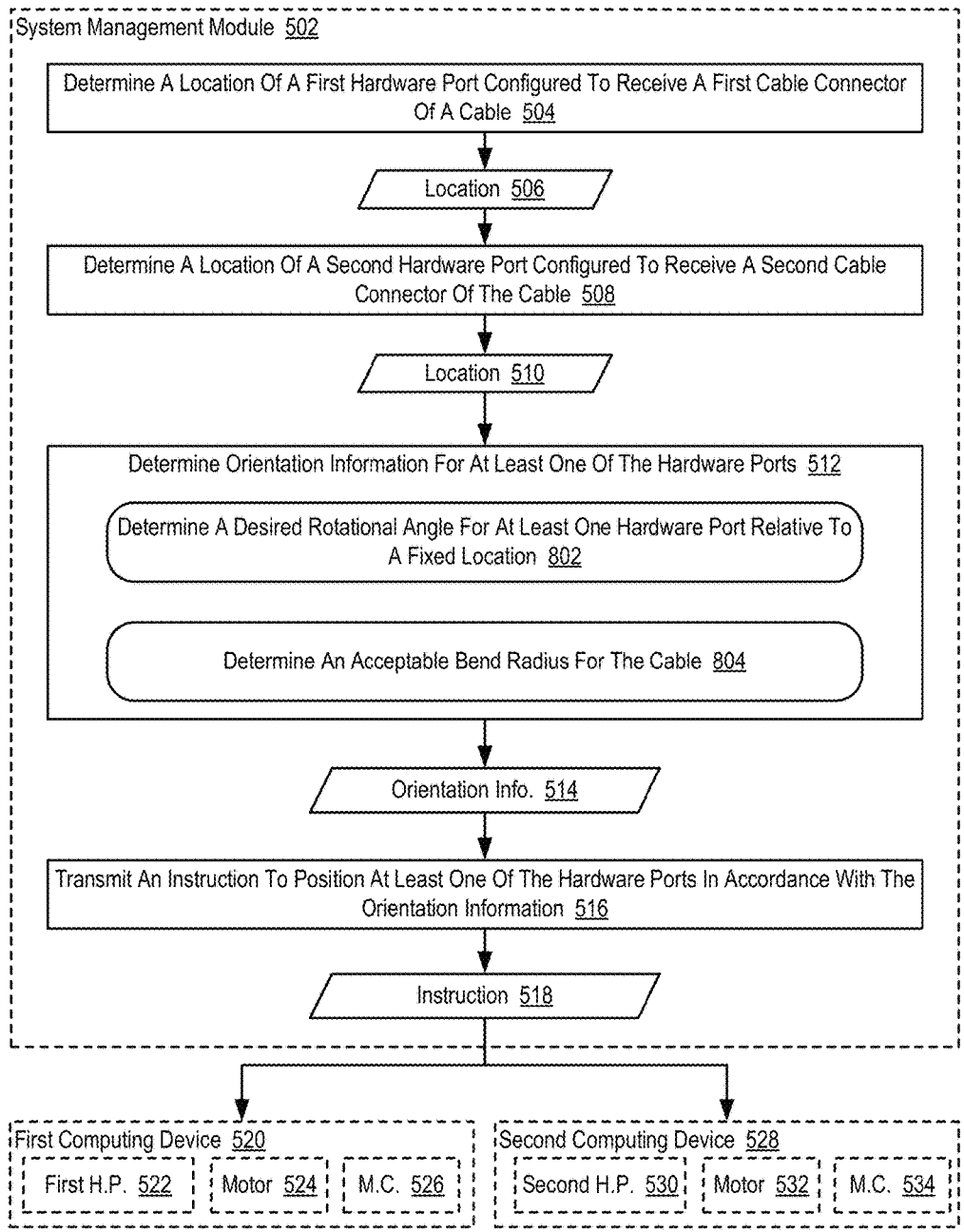
FIG. 8 sets forth a flow chart illustrating a further example method for automatically orienting hardware ports in a computing device according to embodiments of the present invention.

For further explanation, FIG. 8 sets forth a flow chart illustrating a further example method for automatically orienting hardware ports in a computing device according to embodiments of the present invention. The example method depicted in FIG. 8 is similar to the example method depicted in FIG. 5, as the example method depicted in FIG. 8 also includes determining (504) a location (506) of a first hardware port (522) configured to receive a first cable connector of a cable, determining (508) a location (510) of a second hardware port (530) configured to receive a second cable connector of the cable, determining (512) orientation information (514) for at least one of the hardware ports (522, 530), and transmitting (516) an instruction (518) to position at least one of the hardware ports (522, 520) in accordance with the orientation information (518).

In the example method depicted in FIG. 8, determining (512) orientation information (514) for at least one of the hardware ports (522, 530) can include determining (802) a desired rotational angle for at least one hardware port relative to a fixed location. Determining (802) a desired rotational angle for at least one hardware port relative to a fixed location may be carried out, for example, by the system management module (502) performing a lookup in a pre-configured table that associates desired rotational angles with distances. Such distances may be expressed in terms of centimeters, inches, a number of slots between two points, and so on.

In the example method depicted in FIG. 8, determining (512) orientation information (514) for at least one of the hardware ports (522, 530) can include determining (804) an acceptable bend radius for the cable. In the example method depicted in FIG. 2, the acceptable bend radius for the cable may be characterized in terms of degrees and may be a function of the type of material that makes up a cable. For example, a cable comprised of a first material may be capable of meeting predetermined performance metrics at a first bend radius while a cable comprised of a second material may be capable of meeting predetermined performance metrics at a second bend radius. In such an example, determining (804) an acceptable bend radius for the cable may be carried out by receiving a cable type (e.g., Cat 5, Cat 6) or cable material and performing a lookup in a preconfigured table that associates different cables with acceptable bend radiuses.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising:
   a hardware port configured to receive a cable connector;
   a motor operatively coupled to the hardware port; and
   a motor controller, the motor controller configured for:
   receiving orientation information for the hardware port configured to receive the cable connector, wherein the orientation information includes a rotational angle, relative to a fixed location, for the hardware port configured to receive the cable connector; and
   positioning, via the motor, the hardware port configured to receive the cable connector in dependence upon the orientation information, including: determining a desired operational mode for the motor; determining a desired amount of time for the motor to operate; and sending an instruction to the motor to operate in accordance with the desired operational mode for the desired amount of time.

2. The apparatus of claim 1 wherein the motor controller is communicatively coupled to a system management module, and wherein the orientation information for the hardware port is received from the system management module.

3. The apparatus of claim 1 wherein the orientation information for the hardware port includes information identifying the hardware port to be positioned.

4. The apparatus of claim 1 wherein sending an instruction to the motor to operate in accordance with the desired operational mode for the desired amount of time further comprises:
  sending an instruction to the motor to operate in the desired operational mode;
  sending an instruction to power-on the motor; and
  upon the expiration of the desired amount of time, sending an instruction to power-off the motor.

5. An apparatus comprising a computer processor and a computer memory, the computer memory including computer program instructions that, when executed by the computer processor, cause the apparatus to carry out the steps of:
  determining a location of a first hardware port configured to receive a first cable connector of a cable;
  determining a location of a second hardware port configured to receive a second cable connector of the cable;
  determining, in dependence upon the location of the first hardware port configured to receive the first cable connector of the cable and the location of the second hardware port configured to receive the second cable connector of the cable, orientation information for at least one of the first hardware port configured to receive the first cable connector of the cable and the second hardware port configured to receive the second cable connector of the cable, wherein determining orientation information for at least one of the hardware ports comprises determining a rotational angle for at least one hardware port relative to a fixed location; and
  transmitting an instruction to position at least one of the hardware ports in accordance with the orientation information.

6. The apparatus of claim 5 wherein:
  determining the location of the first hardware port configured to receive the first cable connector of the cable further comprises determining a location, within a mounting apparatus, of the first hardware port; and
  determining the location of the second hardware port configured to receive the second cable connector of the cable further comprises determining a location, within the mounting apparatus, of the second hardware port.

7. The apparatus of claim 5 wherein:
  determining the location of the first hardware port configured to receive the first cable connector of the cable includes determining a device type of a computing device that houses the first hardware port;
  determining the location of the second hardware port configured to receive the second cable connector of the cable includes determining a device type of a computing device that houses the second hardware port;
  determining, in dependence upon the location of the first hardware port and the location of the second hardware port, orientation information for at least one of the hardware ports includes determining orientation information for at least one of the hardware ports in dependence upon the device type of the computing device that houses the first hardware port and the device type of the computing device that houses the second hardware port.

8. The apparatus of claim 5 wherein determining, in dependence upon the location of the first hardware port and the location of the second hardware port, orientation information for at least one of the hardware ports further comprises determining a bend radius for the cable.

9. The apparatus of claim 5 wherein determining the location of the first hardware port configured to receive the first cable connector of the cable further comprises determining a relative location of the first hardware port.

10. The apparatus of claim 5 wherein determining the location of the second hardware port configured to receive the second cable connector of the cable further comprises determining a relative location of the second hardware port.

11. A method comprising:
  by first program instructions on a computing device,
    determining a location of a first hardware port configured to receive a first cable connector of a cable;
    determining a location of a second hardware port configured to receive a second cable connector of the cable;
    determining, in dependence upon the location of the first hardware port configured to receive the first cable connector of the cable and the location of the second hardware port configured to receive the second cable connector of the cable, orientation information for at least one of the first hardware port configured to receive the first cable connector of the cable and the second hardware port configured to receive the second cable connector of the cable, wherein determining orientation information for at least one of the hardware ports comprises determining a rotational angle for at least one hardware port relative to a fixed location; and
    transmitting an instruction to position at least one of the hardware ports in accordance with the orientation information.

12. The method of claim 11 wherein:
  determining the location of the first hardware port configured to receive the first cable connector of the cable further comprises determining a location, within a mounting apparatus, of the first hardware port; and
  determining the location of the second hardware port configured to receive the second cable connector of the cable further comprises determining a location, within the mounting apparatus, of the second hardware port.

13. The method of claim 11 wherein:
  determining the location of the first hardware port configured to receive the first cable connector of the cable includes determining a device type of a computing device that houses the first hardware port;
  determining the location of the second hardware port configured to receive the second cable connector of the cable includes determining a device type of a computing device that houses the second hardware port;
  determining, in dependence upon the location of the first hardware port and the location of the second hardware port, orientation information for at least one of the hardware ports includes determining orientation information for at least one of the hardware ports in dependence upon the device type of the computing device that houses the first hardware port and the device type of the computing device that houses the second hardware port.

14. The method of claim 11 wherein determining, in dependence upon the location of the first hardware port and the location of the second hardware port, orientation information for at least one of the hardware ports further comprises determining a bend radius for the cable.

15. The method of claim 11 wherein determining the location of the first hardware port configured to receive the first cable connector of the cable further comprises determining a relative location of the first hardware port.

16. The method of claim 11 wherein determining the location of the second hardware port configured to receive the second cable connector of the cable further comprises determining a relative location of the second hardware port.

\* \* \* \* \*